Figure 1:
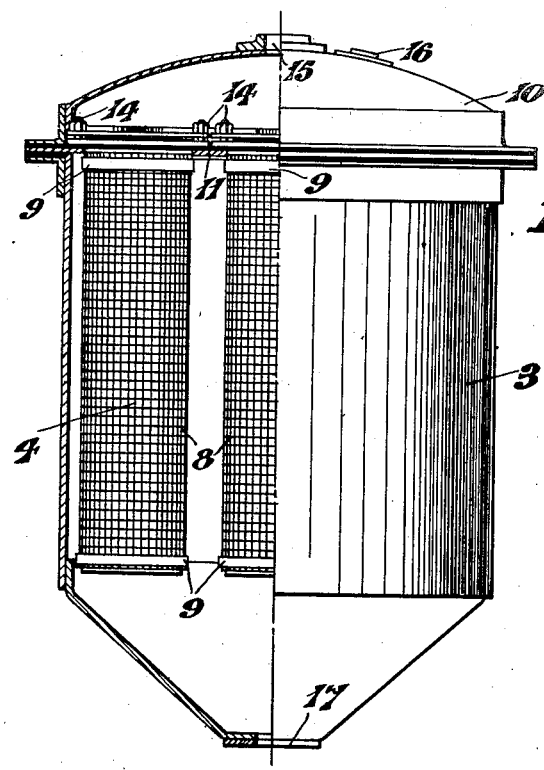

Inventors
Henry Selby Hele-Shaw
and
Joseph Allen Pickard
By B. Singer, atty.

Patented Sept. 15, 1931

1,823,171

UNITED STATES PATENT OFFICE

HENRY SELBY HELE-SHAW AND JOSEPH ALLEN PICKARD, OF LONDON, ENGLAND

FILTRATION

Application filed October 4, 1926, Serial No. 139,525, and in Great Britain November 9, 1925.

In the separation of different liquids in continuous separators, complete separation is frequently impossible on account of very fine particles of one liquid being disseminated through the other, said particles being of such a size as to prevent them from rising or sinking in the same way as do the portions of greater bulk.

In cases of this sort it is necessary in order to obtain one liquid pure to supplement the separator by a refining separator which will retain the very fine particles.

All the separating media hitherto employed have possessed serious disadvantages of one sort or another such as expense, difficulty of cleaning, awkwardness in handling, and production of high back pressure.

We have found that the disadvantages attending the employment of such media, particularly those of clogging and losing elasticity after use and cleaning, arise from the porous and/or physically alterable nature of the fibres.

Such separators as have been employed up to the present operate by absorbing the particles of suspended liquid into the pores of the separating medium whence by reason of their small diameter and high capillary force it is very difficult to remove the absorbed liquid.

We have further found that these disadvantages do not arise when using separating media composed of masses of fine solid threads of non-porous inorganic materials which operate by surface action and undergo no permanent change of either chemical or physical nature during the operations of separating, cleaning or standing.

The employment of solid non-porous threads as a separating medium has the advantage that the liquid to be separated does not penetrate nor is it absorbed by the threads or fibres but clings to the exterior thereof by surface adhesion or tension, and also that steam may be utilized for heating, rendering fluid or removing the oil without the fibres or threads deteriorating or in anywise being affected thereby and if such steam be applied under pressure in a direction reverse to the flow of oil, such oil will be blown back through the said separating medium thus rendering the same ready for further service.

Accordingly in conjunction with a filter of the form described in specification British No. 210,376 or other suitable filter or in general where a free suspension of the type described has to be dealt with we employ a separator having a separating medium of the nature indicated, for example, such as lead wool, glass wool, asbestos fibres, slag wool or the like loosely packed in one or more layers which may be placed in the bottom or end of the separator itself, or in other suitable position and arranged either in series or in parallel and either packed in situ, that is to say, placed directly in the apparatus or packed in removable frames apart from the separator and placed in position when required.

We may employ a number of layer-containing frames which may be arranged in such manner that when it is necessary to renew the first or foulest frame, this latter is removed from the top of the series and a clean frame inserted at the bottom the intervening frames being moved up correspondingly.

Or, we may arrange the filtering fibers in hollow columns by packing them into annular spaces bounded interiorly and exteriorly by perforated pipes and/or wire gauze and closed top and bottom by solid flanges of suitable size attached to the central pipe.

This arrangement is illustrated in the accompanying drawings and constitutes one embodiment of our invention in which:—

Figure 2:
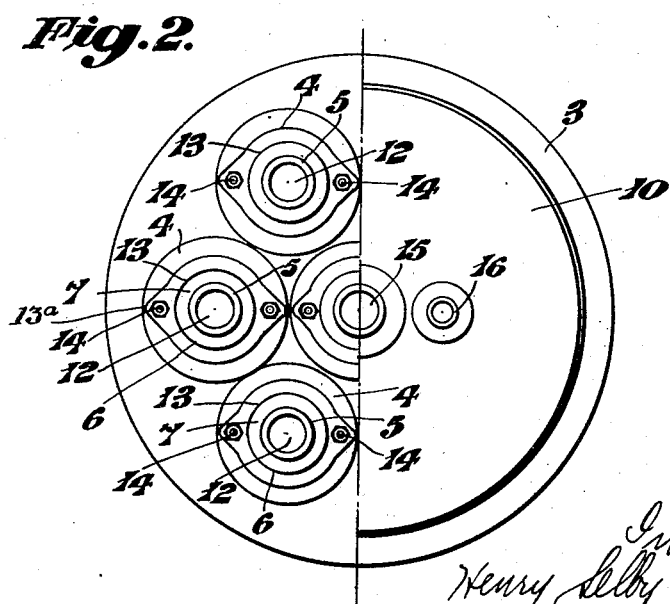

Figure 1 is an elevation partly in section of a liquid separator constructed according to the present invention, and Figure 2 is a plan thereof partly in section.

Referring to the said drawings, 3 represents a cylindrical casing and 4 represents the separating units of which in the embodiment illustrated there are seven. It will, however, be understood that any other number of separating units 4 may, as may be found expedient, be employed, for example there might be only one of such separating units 4.

Each separating unit 4, in the embodiment, consists of a hollow cylindrical column closed at the lower end and made up of concentrically disposed inner and outer perforated tubes 5 and 6 composed of woven or perforated material or metal arranged so as to form an annular space 7 between such tubes in which are loosely packed separating fibres or threads of non-porous material and said tubes 5 and 6 are covered, interiorly of the tube 5 and exteriorly of the tube 6, with wire gauze or the like 8 which with regard to the outer tubes 6 is held in position by means of bands or straps 9 and the gauze covering the interior of the tube 5 is similarly fixed in position or said gauze may be fixed in any other suitable manner.

At the upper end of the cylindrical casing 3 is a chamber 10 divided from the interior of the casing 3 by a plate or partition 11 which is furnished with holes or perforations 12 in which the upper ends of the separating units 4 fit.

The separating units 4 are at their upper ends furnished with flanges 13 having lugs 13a provided with studs or bolts 14 adapted to pass through holes or perforations in the plate or partition 11 and secured by nuts whereby the separating units 4 are suspended from said plate or partition 11.

15 represents the outlet for the separated liquid and 16 represents the inlet for steam which may be utilized for cleaning or for heating the liquid being separated. It will be understood however that said liquid may be heated by means other than steam in which case the inlet 16 may if desired be dispensed with.

The casing 3 below the separating units 4 is preferably of inverted conical formation and provided at the bottom with an inlet 17 for the mixture of liquids.

In operation liquid or mixture to be separated enters the separator by the inlet 17 and passes into the chamber 3 and thence into units 4 where it percolates through the separating medium in the annular space 7 between the tubes 5 and 6 and thence through the perforations 12 into the chamber 10 and away by the outlet 15.

The separating medium employed is as before explained composed of masses of fine solid threads or fibers of non-porous inorganic material or materials of such nature that it is unaffected by steam or heat so that it is possible to employ steam for the purpose of heating the mixture or liquid to be separated and said threads or fibers of the nature above described will undergo no permanent change of either a chemical or physical nature during the operations of separating, cleaning or standing.

Owing to the solid and non-porous nature of the separating medium employed the stickiest or densest liquid of the mixture or liquid in the course of separation will adhere to the surface of the separating fibers or threads by surface tension or adhesion and also be retained between the same by capillary attraction and will not penetrate or be absorbed by the same thus rendering it an easy matter to clean the separating medium which may be used over and over again.

Instead of arranging the separating medium in columns as shown it may be disposed in layers and contained in frames mounted in a pile in such manner that the frame containing the first or foulest layer of separating medium may be removed and a frame containing clean separating medium may be inserted at the bottom of the pile the intervening frames being moved up correspondingly.

The said columns or the layer-containing frames may if desired be mounted so that the separating medium contained therein may be disposed horizontally or vertically or in the same cases even in an inclined position.

It will be understood that in all cases the separating medium must be of such depth or thickness and disposed or arranged in such manner as to ensure that all the mixture liquid to be separated passes therethrough.

By the means hereinbefore described a liquid separator is obtained in which all the disadvantages of such apparatus as heretofore constructed and hereinbefore pointed out are obviated while facilitating the cleaning of the apparatus without detriment to the separating medium or any part of the apparatus.

What we claim and desire to secure by Letters Patent is:—

A separator for separating fluids having different degrees of adhesiveness from a mixture, comprising a casing having a mixed fluid inlet and a separated fluid outlet, a plate having a series of openings fixed transversely in the casing between the inlet and outlet, a series of separate units each comprising concentrically disposed tubes of different diameters of perforate material and in the annular space between which are located threads of inorganic material in the manner set forth, each unit being provided at its upper end with a flange and means for bolting it to the transversely arranged and removable plate with the unit extending through one of the openings in the transverse plate, the upper end of the unit being open and its lower end closed so that the mixed fluid will pass against and between the threads of inorganic material.

In witness whereof we affix our signatures.

HENRY SELBY HELE-SHAW.
JOSEPH ALLEN PICKARD.